G. A. ROBERTS.
CHANGE MAKING, COMPUTING, AND PAYING MACHINE.
APPLICATION FILED APR. 16, 1913.

1,166,936.

Patented Jan. 4, 1916.

4 SHEETS—SHEET 1.

WITNESSES:
William A. Kadtke.
Oscar W. Dauber.

INVENTOR
Gustin A. Roberts.
BY
Andrew J. Neureuther
ATTORNEY

G. A. ROBERTS.
CHANGE MAKING, COMPUTING, AND PAYING MACHINE.
APPLICATION FILED APR. 16, 1913.

1,166,936.

Patented Jan. 4, 1916.
4 SHEETS—SHEET 2.

WITNESSES:
William A. Radtke.
Oscar W. Dauber.

INVENTOR
Gustin A. Roberts
BY
Andrew J. Neureuther
ATTORNEY

G. A. ROBERTS.
CHANGE MAKING, COMPUTING, AND PAYING MACHINE.
APPLICATION FILED APR. 16, 1913.
1,166,936.
Patented Jan. 4, 1916.
4 SHEETS—SHEET 3.
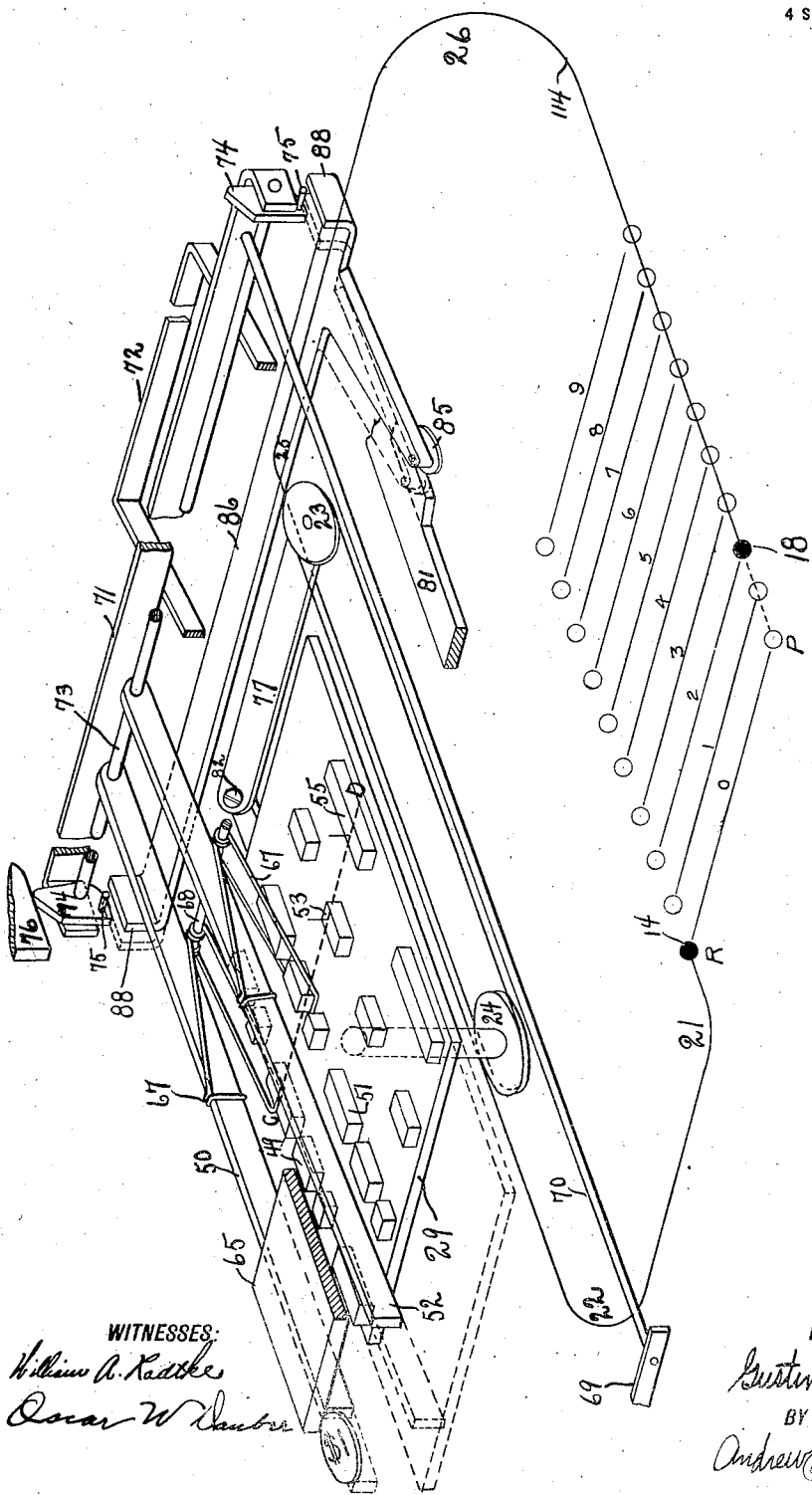

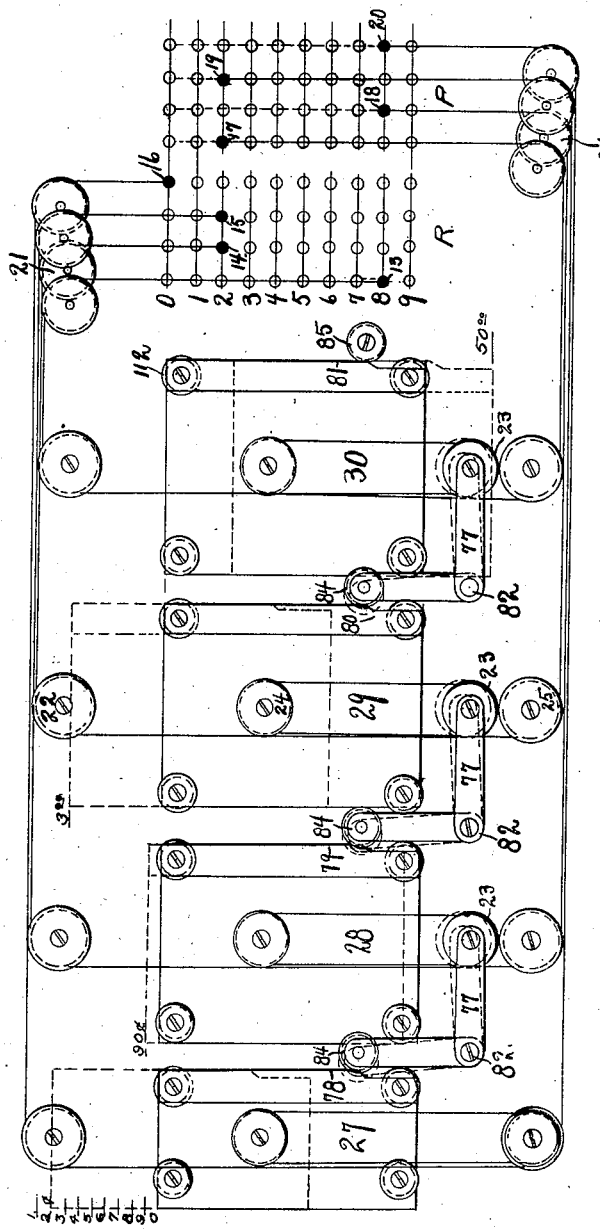

UNITED STATES PATENT OFFICE.

GUSTIN A. ROBERTS, OF PORTLAND, OREGON.

CHANGE MAKING, COMPUTING, AND PAYING MACHINE.

1,166,936.  Specification of Letters Patent.  Patented Jan. 4, 1916.

Application filed April 16, 1913. Serial No. 761,488.

*To all whom it may concern:*

Be it known that I, GUSTIN A. ROBERTS, a citizen of the United States, and a resident of the city of Portland, in the county of Multnomah and State of Oregon, have invented certain new and useful Improvements in Change Making, Computing, and Paying Machines, of which the following is a specification.

My invention relates to change making, computing and paying machines and has for its objects the production of a simple and reliable machine for instantaneously computing and paying the difference between two monetary values with the utmost accuracy. Change to any amount within a predetermined limit may be delivered, provision being made for receiving or depositing money or checks of any value, whether the latter be in form of even dollars, or representing fractional parts of dollars, and for deducting therefrom the amount of the purchase and delivering the exact change.

With these and other objects in view, as will more fully hereinafter appear, the invention consists in certain novel features of construction and arrangement of parts, hereinafter described, illustrated in the accompanying drawings, and particularly pointed out in the claims.

Figure 1:
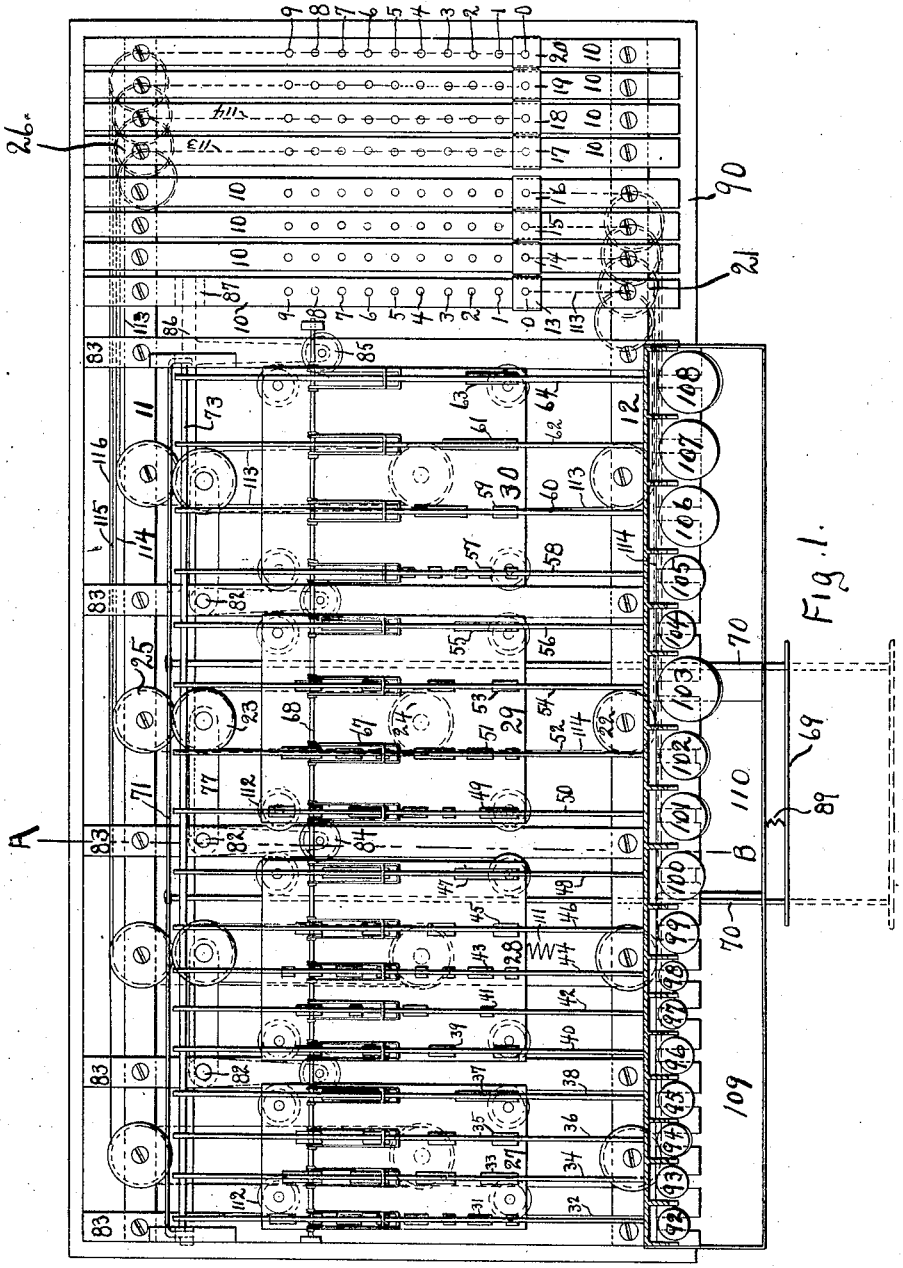
Figure 5:
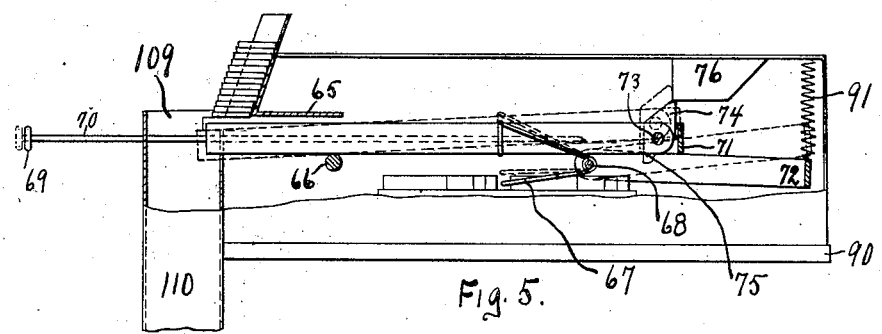
Figure 4:
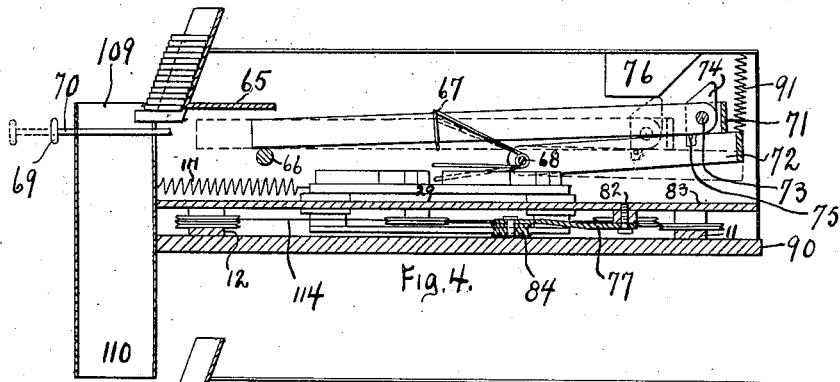
Figure 3:
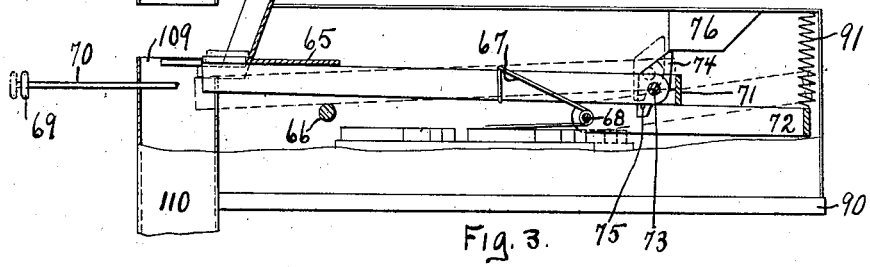
Figure 2:
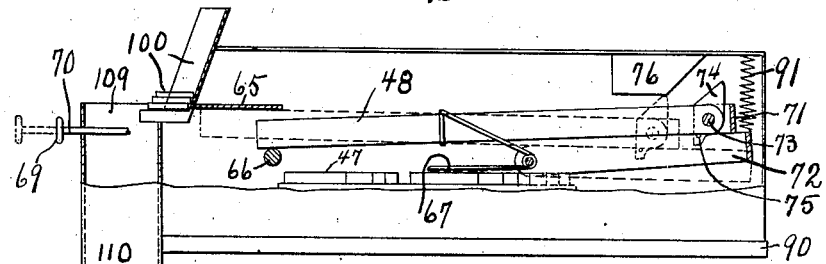

In the drawings, Figure 1 shows a plan view of my machine with the containing case removed. Fig. 2 shows a right end elevation in partial section along a line A B showing the position of the mechanism for an amount received and a less amount purchased. The solid lines show the position of the parts at rest, while the dotted lines show the position of the parts after the selection of the paying combination. Fig. 3, shows the same view as shown in Fig. 2 except that the solid lines show the position of the parts at the instant of the payment of the coins, while the dotted lines show the parts in their extreme forward position. Fig. 4, shows the same view as shown in Fig. 2, the solid lines showing the rest position of the parts, while the dotted lines show the second position of the parts on a nothing purchased, nothing received, transaction. Fig. 5, shows the same view as shown in Figs. 2, 3, and 4 except that the solid lines show the third position of the parts, while the dotted lines show the fourth position of the parts. Fig. 6, is a perspective diagram showing the chain of operations from one set of operating keys or shoes through the required parts and back to the other set of shoes and the resulting change. Fig. 7, is a diagrammatic bottom view of my machine showing the parts in the two positions in the transaction of $82.20 received and $28.28 purchased.

Similar numerals represent similar parts throughout the several drawings.

From the drawings (see Fig. 1) it will be seen that my machine uses two keyboards, the left hand board on which is registered the amount of money received, and a right hand board on which is registered the amount purchased. The range of each board is from one cent to ninety-nine dollars and ninety-nine cents.

In the drawings 11 and 12 are members or sills mounted on 90, which comprises the base or frame of the machine as I have shown it. Connecting said members and fastened thereto is a series of strips 10, each having a shoe 13, 14, 15, 16, 17, 18, 19 and 20 respectively slidably mounted on said strips. Each of said shoes has a pin which is slidably mounted in the aperture of the shoe as shown and which can be adjusted and which is retained in the aperture by means of a spring, not shown which pin registers with a series of apertures 1, 2, 3, 4, 5, 6, 7, 8 and 9 in each of said strips 10 fastened to the under side of each of the shoes 13, 14, 15 and 16 are the tapes or wire cables 113, 114, 115 and 116 which connect with shoes 17, 18, 19 and 20 respectively, making the following combinations 13 and 17, 14 and 18, 15 and 19, 16 and 20. Each of the wires which connect the various pairs of shoes above mentioned passes over a series of pulleys shown, as for instance the wire 114 which connects shoes 14 and 18 after leaving the shoe 14 passes over pulleys 21 and 22 which are journaled on frame 12 then over pulley 23 which is journaled on bell crank lever 77 which is pivoted at 82 to selector plate guide or track 83 which is mounted on frames 11 and 12, then over pulley 24 which is journaled on slidably mounted plate or selector plates 29, then over pulley 25, then over pulley 26, both of which are journaled on member 11, thence connects with shoe 18. This is typical of each of the wires as each is similarly connected.

Selector plate 29 has a roller 112 journaled on each of its four corners which rollers run on a track 83 as above mentioned and from the manner in which plate 29 is connected, by means of wire 114, with shoes 14 and 18 it is evident that any change in position of either shoe 14 or 18 makes a certain definite change in the position of selection plate 29 along the tracks 83, and for every position of either shoe on bars 10, that position of 29 can be predetermined. Journaled on the other end of bell crank lever 77 is a roller 84 which engages with a cam 80 (see Fig. 7) fastened to selector plate 29 and whose function will be explained below.

Selector plate 29 has several series of projections or elevations among which are 49, 51, 53 and 55 which act as supports for the lower end of the formed spring bell crank levers 67, which are mounted on the shaft 68. The upper end of each of the formed spring bell crank levers 67 is formed into a loop through each one of which passes one of the bars or ejectors 50, 52, 54 and 56 on plate 29, which are placed immediately above the projections or elevations 49, 51, 53 and 55 respectively on selector plate 29. Selector plates 27, 28 and 30 are similarly mounted on tracks as is selector plate 29 as shown in Fig. 1. Selector plate 27 has a similar series of projections or elevations 31, 33, 35 and 37 immediately under bars or ejectors 32, 34, 36 and 38 respectively each of which levers has the formed spring bell crank lever 67 as above described by means of which it is controlled from the projections above mentioned on selector plate 27. Selector plate 28 has a similar series of projections: 39, 41, 43, 45 and 47 which are fastened immediately under the bars or ejectors 40, 42, 44, 46 and 48 respectively each of which levers has the formed spring bell crank lever 67 as above described. Selector plate 30 has a similar series of projections 57, 59, 61 and 63 which are positioned under the bars or ejectors 58, 60, 62 and 64 respectively, each of which levers has the formed spring bell crank levers 67 as above described.

The bar or ejectors 32, 34, 36, 38, 40, 42, 44, 46, 48, 50, 52, 54, 56, 58, 60, 62 and 64 are journaled on a rod 73 whose ends pass through the bent ends of a frame 71 which rests and slides on a spring loaded frame 72, journaled on rod 68, (see Fig. 6) which tends to push frame 71 upwardly by means of a spring 91, (see Fig. 2). Mounted on a rod 73 are cams 74, each of which carries a stop pin 75, which permit cams 74 to rotate a small distance in one direction only. Fastened to frame 71 are rods 70 which are fastened in a member or operating handle 69 by means of which the frame 71 is pulled forwardly to eject coins from the coin stacks 92, 93, 94, 95, 96, 97, 98, 99, 100, 101, 102, 103, 104, 105, 106, 107 and 108 which are immediately in front of the above mentioned ejectors 32, 34, 36, 38, 40, 42, 44, 46, 48, 50, 52, 54, 56, 58, 60, 62 and 64 respectively, as shown (see Fig. 1). Immediately in the paths of the cams 74 are the fixed cams 76 which as frame 71 is moved forwardly by means of operating handle 69 engage with the cams 74 and depress the frame 71 with the rear or back end of the ejectors 32 to 64 inclusive and therefore elevate the forward end of said ejectors since they are fulcrumed in the formed end of formed spring bell crank lever 67 as above described, the height to which this forward end is elevated to will depend on whether the lower end of formed spring bell crank lever 67 is resting, for instance, on one of the series of projections 49, 51, 53 and 55 on selector plate 29, or if it is resting at a point in between any two projections of any one of the series of projections, and similarly on all the other selector plates above mentioned.

Normally the forward ends of bars or ejectors 32 to 64 inclusive rests on a rod 66 as shown in Fig. 2 in the solid lines and when the lower end of formed spring bell crank lever 67 rests on any one of the projections or elevations and 69 is pulled forward until cam 74 engages cam 76 the forward end of the ejector will be up against the plate 65 as shown in the dotted lines in Fig. 2, so that if the forward motion of operating handle 69 is continued the forward end of the ejector will scrape off one or more coins from the bottom of the stack of coins, as shown in Fig. 3. When the forward motion of 69 is continued until cam 74 passes over the forward end of the cam 76, when the forward end of the ejector again drops to its normal position on the rod 66.

When the lower end of the formed spring bell crank lever 67 is not on the top of a projection, but in between two of the projections, as 69 pulled forward the forward ends of the ejectors are not raised from the rod 66 as shown in Fig. 4 and as the forward motion of 69 is continued the forward end of the ejector never rises high enough to reach the lower coin in any of the coin stacks, so that they pass through underneath each stack without removing a coin as shown in Fig. 5.

When 69 is pushed backwardly manually or pulled back by means of a spring indicated at 39, the cam 74 having a limited rotary motion, as above described, as soon as it strikes cam 76 is tilted sufficiently that it passes under cam 76 without depressing the rear end of the ejector and, therefore, keeps the forward end from touching the coins and plate 65, avoiding the consequent friction of same. As the coins are ejected from the bottom of any of the stacks they pass into the delivery chute 109 which is fastened to the base of the machine 90 and escape through the opening 110 in bottom of the chute 109. The coin stacks are arranged as follows: 92 and 93 are stacks which pay 1 cent at each operation or complete forward motion of operating handle 69. 94 is a stack which pays two cents at each operation. 95 is a stack which pays five cents at each operation. 96 is a stack which pays out five cents at each operation requiring the payment of a twenty-five cent piece. 97 and 98 are stacks for ten cent coins and pay one ten cent piece at each operation. 99 is a twenty-five cent coin stack, paying one twenty-five cent piece at each operation. 100 is a fifty cent coin stack paying one fifty cent piece at each operation. 101 and 102 are fifty cent coin stacks which each pay two fifty cent pieces at each operation. 103 is the coin stack which pays two one dollar coins at each operation. 104 is a coin stack which pays one five dollar gold piece at each operation. 105 is a coin stack for ten dollar gold pieces and pays one ten dollar gold piece at each operation. 106 and 107 are coin stacks for twenty dollar gold pieces, and pay one twenty dollar gold piece at each operation. 108 is a coin stack for twenty dollar gold pieces, paying two twenty dollar gold pieces at each operation.

In order to get the method of operation of my machine let us follow through a line of transaction such as $8.00 received and $2.00 purchased. (See Fig. 6.) Shoe 14 is at 0 and shoe 18 is at 2. The wire connecting these two shoes must pass over sheaves at 21, 22, 23, 24, 25 and 26; and 24 being mounted on sliding plate 29, imparts the resulting motion to same. The movement of selector plate 29, which controls payments of amounts from $1.00 to $9.00, brings into position elevations 49, 53 and 55, which act as supports for lower end of spring bell crank levers 67, mounted on shaft 68, the upper end of which being a fulcrum slide for the coin ejecting bars themselves. After sliding shoe 18 has been set as mentioned, operating handle 69 is pulled out, much in the same manner as a desk draw. Rods 70 transmit motion to frame 71, which rests on spring loaded frame 72, which tends to hold 71 upward. Through the bent ends of rod 71 passes the rod 73, which also passes through ejectors 32, 34, 36, 38, 40, 42, 44, 46, 48, 50, 52, 54, 56, 58, 60, 62 and 64, (see Fig. 1.) and through pivotally mounted cams 74, which carry stop-pins 75, which permit cams 74 to rotate a small distance in one direction only. Now when a movement of 69 carries frame 71, and all parts fastened thereto, forward, cams 74 engage fixed cams 76 and force entire frame 71 downward, as well as rear end of ejector bars 32 to 64, the front end of ejectors normally resting on rod 66 as shown in Fig. 2. It follows that if the ejector is mounted centrally in the fulcrum, loop or slide of 67, and the lower end of 67 is supported by elevation 49, and the rear end of bar 50 is depressed while advancing, that the front end of bar 50 must be elevated as shown in dotted position of ejector in Fig. 2. Ejector 50 is now scraping the under side of plate 65, and in its path lies the bottom of a stack of $1.00 coins. Then the bottom coin will be removed by a continued movement of 50, as shown in full in Fig. 3, while a still further movement of 50 permits 74 to pass 76, and frame 71 which carries rear end of ejectors, to be raised by spring-loaded frame 72, and, of course, permits the dropping of forward end of all ejectors, thereby avoiding the friction caused by ejectors carrying weight of entire coin stack, which has now fallen to the depth of the removed coin.

It will be noticed on Fig. 6 that member 67 on bar 52 did not encounter elevation 51, so it did not raise 52 high enough to pay a coin from its stack. Lower ends of 67 all strike or miss their elevations along line CD (Fig. 6), and by further inspection of Figs. 1 and 6 it will be see that Bar 50 will pay $1.00
" 52 " " Nothing
" 54 " " $2.00
" 56 " " $5.00

Total_____$8.00

While the transaction covered by this plate is really $00.00, minus $2.00, we actually borrow $10.00 from plate 30, which is its unit, or the least amount it can pay. This will be explained further. The principle involved is the same on all the plates. Plate 28 has five rows of elevations, while the others have but four. This is caused by the twenty-five cent piece entering into the payments from this plate, and it requires the addition of a five cent piece to make this unit a multiple, or fraction, of ten cents, the unit of plate 28. If desired, 39 and 45 can be combined as they are in duplicate. It will also be noticed that when keys, or shoes, are set at 0, that lower ends of arm 67 are in line with the center of the plates where there are no elevations at all. In other words, the resultant of any registered values other than equality will move the plates on one side or on the other of the zero centerline of the plates. It will also be observed that on plates 27, 28 and 29 there are two similar sets of elevations, one set on each side of the zero line. Assume shoes 14 and 18 to be at 0, then no payment will be made. Now set 14 at 1 and let 18 remain at 0; 29 moves one space, or one-half of a key board space, and lug 49 only, comes into position and causes payment of one dollar. Now let us set 14 at 0 and 18 at 1; starting from its zero, plate 29 will move one space in opposite direction, and lugs or elevations, 49, 51, 53 and 55 will come into position and cause a payment of $9.00, which is the actual subtraction of $1.00 from nothing, plus a borrowed $10.00. On returning 69 to rest, 74 makes a partial rotation on its pivot and passes under 76 without depressing frame 71. If the same transaction occurs on the next operation, all that need be done is to operate 69 as before. Otherwise shoes 13 to 20 must be readjusted. Passing on to a more difficult problem for this class of machine I refer you to Fig. 7. Only those parts are shown that are actually required, and the relation of plates and "borrowing" is explained.

Taking the transaction $82.20 received
28.28 purchased
───────────
$53.92 change due 13 is set at 8, 14 at 2, 15 at 2, and 16 at 0. This enters the amount received on the "R" keyboard. 17 is set at 2, 18 at 8, 19 at 2 and 20 at 8.

Borrowing is accomplished in this manner: Sheaves 23 are mounted on bell crank levers 77, pivoted at 82 on selector plate track 83, which are mounted on sills 11 and 12. The other end of 77 carries a roller 84, which rides on and is actuated by cams 78, 79 and 80. For the sake of convenience, we will call that portion of the selector plate that pays by borrowing, the negative side; and that portion that pays without borrowing, the positive side. Full lines in Fig 7 show plates at their zero position, which is the last positive position, and the rolls are ready to descend the decline. Firstly—shoes 13, 14, 15 and 16 are positioned. The machine if now operated would pay $82.20. Secondly—shoe 17 is set at 2, and plate 30 will pay $60.00. Shoe 18 is set at 8, and 29 pays $4.00, while roller 84 drops to the negative, or low portion of the cam, which permits 30 to drop back one space and pay $50.00 instead of $60.00. 19 is then moved to 2 and plate 28 will pay nothing. 20 is then moved to 8 and pays two cents, but it is in its negative section and permits roll 84, sheave 23, and plate 28, to leave its positive zero position and pay 90 cents from a negative position. 28 now being in a negative position, permits 29 to drop back from its negative $4.00 position to a negative $3.00 position.

Summing up the final position of the four plates:—

30 will pay $50.00
29  "   "    3.00
28  "   "     .90
27  "   "     .02
              ─────
Total__$53.92

It will be noticed that the dropping back of any plate caused by the one below it being on its negative position, causes it to pay one unit less: a unit being the least amount which can be paid from that plate.

It will be seen on Fig. 7 that plates 27, 28 and 29 are in the negative position, while plate 30 is in the positive. No matter what position 27, 28 and 29 are in, no money will be paid unless 30 is positive. For example: With $28.85 received and $30.00 purchased all the plates are in the positive except 30, whose cam 81 acts on roller 85, which is mounted on sliding bar 86, mounted in guide 87. (See Fig. 1.) The lugs 88 on bar 86, when moved forward to dotted position shown in Fig. 6, by plate 30, and its cam 81, being in a negative position, will contact with studs 75 on cam 74, and cause them to rotate and slide beneath 76 without depressing 71 in the same manner in which the parts are ordinarily returned to rest. Of course keys can be used for positioning the plates. Indeed, where all the plates are set and ejecting done in one operation, there is a decided advantage as the less money paid the less movement is required by the operating parts.

It will be understood, of course, that while I have here shown one form of my invention, I do not wish to limit myself to the exact form shown, but desire to have it taken in a sense diagrammatic of any or all forms as come fairly within the appended claims.

I claim:—

1. In a change making machine, a frame, a plurality of selector plates movably mounted on said frame, means for pre-determining the position of each of said selector plates, said means comprising two members adjustably positioned on said frame and flexibly interconnected with each other and with a selector plate; registering means on each of said selector plates, a movably mounted cam controlled carrier, a plurality of ejectors pivotably mounted on said carrier, ejector positioning means which co-act with said registering means, and means for moving said carrier.

2. In a change making machine, a frame, a plurality of selector plates movably mounted on said frame, means for pre-determining the position of each of said selector plates, said means comprising two members adjustably positioned on said frame and flexibly interconnected with each other and with a selector plate; registering means on each of said selector plates, a movably mounted cam controlled carrier, a plurality of ejectors pivotably mounted on said carrier, ejector positioning means which co-act with said registering means, coin retaining means, and means to bring the ends of said ejector beyond the coin retaining means.

3. In a change making machine, a frame, a plurality of selector plates movably mounted on said frame, means for pre-determining the position of each of said selector plates, said means comprising two members adjustably positioned on said frame and flexibly interconnected with each other and with a selector plate; registering means on each of said selector plates, a movably mounted cam controlled carrier, a plurality of ejectors pivotably mounted on said carrier, ejector positioning means which co-act with said registering means, coin retaining means and means for moving said carrier so that the ends of said ejectors will remove coins from said coin retaining means.

4. In a change making machine, a frame, a plurality of selector plates movably mounted on said frame, means for pre-determining the position of each of said selector plates, said means comprising two members adjustably positioned on said frame and flexibly interconnected with each other and with a selector plate; registering means on each of said selector plates, a movably mounted cam controlled carrier, a plurality of ejectors pivotably mounted on said carrier, ejector positioning means which co-act with said registering means, coin retaining means, means for moving said carrier so that the ends of said ejectors will remove coins from said coin retaining means, and means for collecting the coins so removed and discharging them at a common point.

GUSTIN A. ROBERTS.

Witnesses:
EDWARD B. BIRKENBEND,
W. VERNON ALCORN.